July 2, 1963 H. J. WINN 3,096,079
FENCE PANELS FOR ROADWAYS
Filed Jan. 13, 1961 2 Sheets-Sheet 1

INVENTOR
HENRY J. WINN

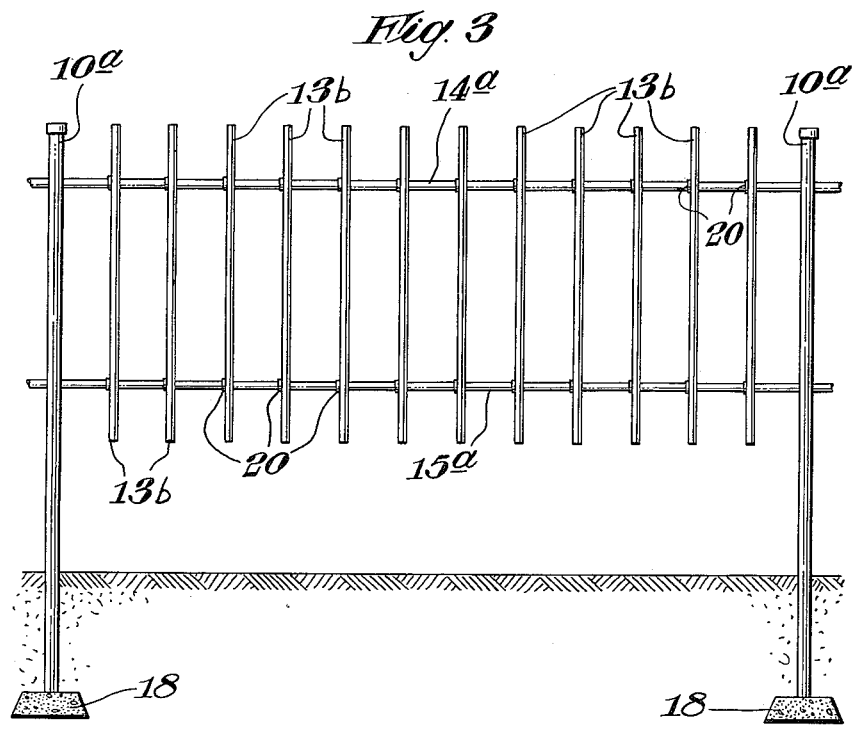
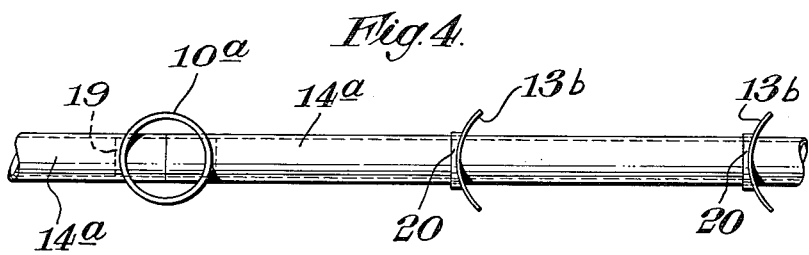

United States Patent Office 3,096,079
Patented July 2, 1963

3,096,079
FENCE PANELS FOR ROADWAYS
Henry James Winn, 29 Between Sts., Cobham, England
Filed Jan. 13, 1961, Ser. No. 82,609
Claims priority, application Great Britain Jan. 14, 1960
5 Claims. (Cl. 256—24)

This invention relates to a barrier between separate tracks of a highway to eliminate dazzle caused by lights of oncoming traffic. As is well known dazzle due to headlights of automobiles and other vehicles is a very real source of danger, especially on bends, where the driver of an automobile on the outside track is in the path of beams of light from automobiles on the inside track.

An object of the invention is to provide an anti-dazzle barrier which is of simple construction and can be easily erected and which whilst serving to reduce dazzle, nevertheless does not cut off vision from one track to the other completely. A further and important object of the invention is to provide an anti-dazzle barrier which is light in weight and can be made from material which, although strong enough to stand up to usage, is such that in the event of an automobile or other vehicle striking same, will break up easily. It is well known that an automobile when travelling at an excessive or high speed and especially under adverse weather conditions, may skid and leave its track and crash into the division barrier and that serious accidents to occupants have been caused simply by impact with the dividing barrier which may be of or include material such as concrete in its structure or even consist of earthwork.

Another object of the invention is to provide an anti-dazzle highway barrier in which the cut-off of beams of light from one side to the other can be set according to conditions, for example the degree of cut-off can be different on straight stretches compared with curves and bends.

Barriers according to this invention can be made wholly or partly of synthetic plastic material, which is cheap, strong, and resilient and in certain forms, if struck will not break up into sharp pieces.

Reference will now be made to the accompanying drawings, showing preferred examples according to the invention. In the drawings:

FIGURE 3 and FIGURE 4 are views similar to FIGURES 1 and 2 of another form of fence or barrier.

Figure 1:
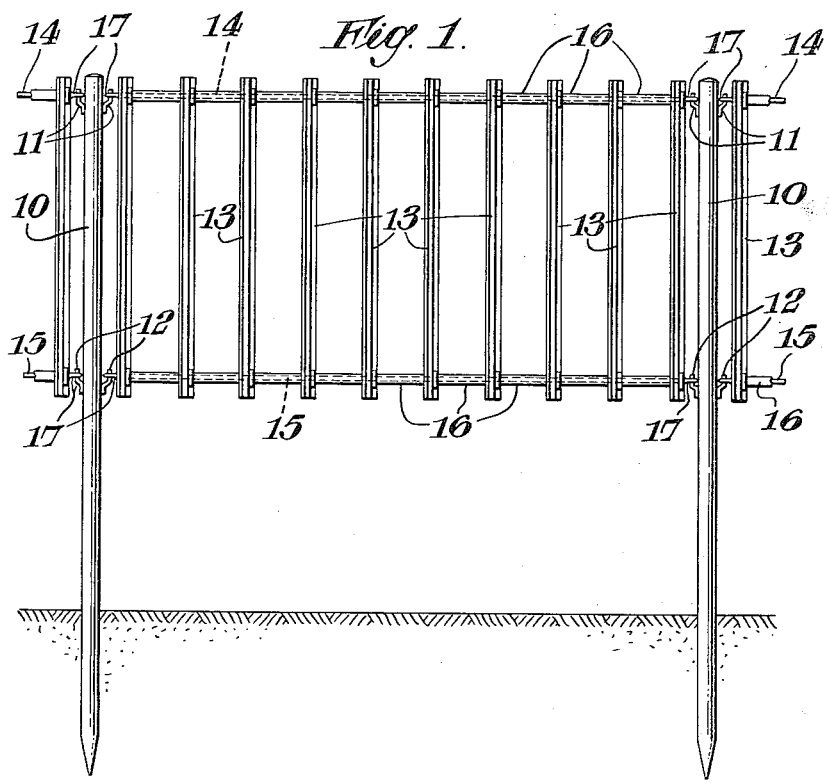
FIGURE 1 is a side view of one form of fence or barrier.
Figure 2:
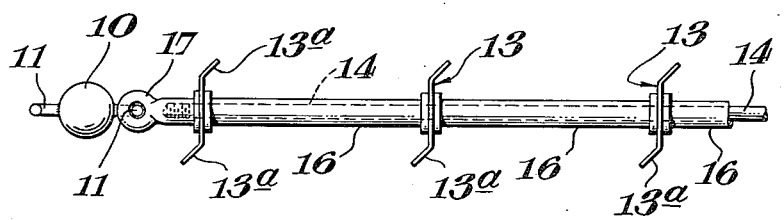
FIGURE 2 is a fragmentary plan view thereof.

Referring first to FIGURES 1 and 2, upright posts 10, 10, are provided, these being of tubing with pointed lower ends, or the ends may be set in concrete blocks as later described with reference to FIGURES 3 and 4. Two hook members 11, 12, are provided on each side of each post so that in a run of fencing, an upper series of hooks 11 and lower series 12 are provided.

Each fence unit consists of a number of pales or strips 13—13, with upper and lower horizontal rod members 14 and 15. The rod members pass through holes through the pales, so that each unit consists of two rod members 14, 15, with a series of vertical pales thereon. These pales are spaced apart according to circumstances, and spacing members such as flange ended tubes 16, may be provided so as to maintain the pales at correct spacing and vertical.

An eye 17 is provided at each end of each rod. In this way, an assembled unit can simply be hung onto or lifted from, the hooks of adjacent uprights. The eye member can be carried by sockets which threadedly engage the rod ends to provide a limited degree of adjustment of overall length.

It will be noted that the pales have angled back side parts or side wings 13a, 13a—and the arrangement is such that under normal circumstances, head-lamp glare from one carriageway to the other is prevented although visibility is not completely cut off.

Instead of using rod members 14, 15, strainer wires could be used. In such case suitable struts for uprights can be provided. The spacers can be in the form of sleeves split longitudinally whereby they can be slipped over a rod or wire after the pales have been set up.

Referring now to FIGURES 3 and 4, the fence consists of hollow tubes 10a, 10a, forming uprights, these being suitably mounted in spaced apart relation, for example supported by bases 18 set in the ground. These tubes are made from P.V.C. or other synthetic plastic. The pales 13b are of a similar material although as they are thin, approximately one thirty second part of an inch, they could be of other sufficiently rigid material. They are curvilinear in horizontal cross-section as seen in FIGURE 4, or they could have marginal parts angled back as seen in FIGURE 2. It will be appreciated that with the curved pales 13b, there are provided, in relation to light beams from one side directed at an acute angle with respect to the vertical plane of the barrier, side wing parts which effectively prevent direct rays of light from passing through the barrier.

The pales are mounted on upper and lower horizontal rails comprising tubes 14a, 15a, of synthetic plastic of a diameter less than the diameter of the uprights. These rails are mounted on the uprights by providing holes through the uprights into which ends of the rails fit, the abutting ends of rails being within uprights where they may be joined by a tubular insert 19. The pales have holes through them so that they can be threaded on to the rails.

In order to locate the pales correctly on the rails and in desired spaced relation, spacing members can be used, but preferably, the pales have collars or bosses 20 on one face around each hole (if curved the convex face), these collars embracing the rails when in position. It will be appreciated that the spacing of the pales depends on the location of the fence, being closer on a curve than on a straight run, the rails being curved, of course, where required. The provision of the collar enables the pales to be fixed, for example by adhesive, welding or like means. In the same manner, the rails can be secured together and to the uprights.

The fence herein described is easy to manufacture, is light and can be erected easily. If struck by a vehicle, it offers practically no resistance, nor has it any projecting parts.

It will be understood that the construction shown in FIGURES 1 and 2 can be made mainly from synthetic plastic material if so desired. In all cases, a fence or barrier which is easy to assemble, of sufficiently rigid construction to withstand normal conditions, and which prevents any appreciable headlamp glare from passing from one carriageway to the other, is provided.

I claim:

1. A barrier between separate tracks of a highway to eliminate dazzle of lights of oncoming traffic, said barrier comprising spaced uprights carrying horizontal pale supporting rails, a plurality of spaced apart pales mounted in vertical disposition on said rails, said pales comprising strips of thin sheet material having holes therethrough on the longitudinal centerline for the passage of the rails, said pales extending transversely of the rails and providing a series of side wings on both sides of the rails which wings are set at an angle to interrupt beams of light of oncoming traffic.

2. A barrier as claimed in claim 1, comprising pales which are arcuate in horizontal cross section.

3. A barrier as claimed in claim 1, comprising pales having angled back marginal side parts.

4. A barrier between separate tracks of a highway to eliminate dazzle of lights of oncoming traffic, said barrier comprising spaced uprights carrying horizontal pale supporting rails, a plurality of spaced apart vertical pales comprising strips of thin sheet material having holes therethrough on the longitudinal centerline, for the passage therethrough of the rails, spacing members on the rails between the pales to hold said pales in desired spaced relation, said pales extending transversely of the rails and providing a series of vertical wings on both sides of the rails which are set at an angle to interrupt beams of light of oncoming traffic.

5. A barrier between separate tracks of a highway to eliminate dazzle of lights of oncoming traffic, said barrier comprising spaced uprights carrying horizontal pale supporting rails, a plurality of spaced apart vertical pales comprising strips of thin sheet material having holes therethrough on the longitudinal centerline for the passage therethrough of the rails, said rails being joined to the pales in desired spaced apart relation and extending transversely of the rails to provide a series of vertical wings on both sides of the rails which are set at an angle to interrupt beams of light of oncoming traffic.

References Cited in the file of this patent

UNITED STATES PATENTS

| | | |
|---|---|---|
| 48,086 | Nevins | June 6, 1865 |
| 54,794 | Thompson | May 15, 1866 |
| 2,545,845 | Du Botto et al. | Mar. 20, 1951 |
| 2,789,792 | Davis | Apr. 23, 1957 |
| 3,004,145 | Kroes | Oct. 10, 1961 |